United States Patent
Chase et al.

(10) Patent No.: US 11,231,709 B2
(45) Date of Patent: Jan. 25, 2022

(54) AUTONOMOUS VEHICLE MODE REGULATOR

(71) Applicants: Arnold Chase, West Hartford, CT (US); William Chase, West Hartford, CT (US)

(72) Inventors: Arnold Chase, West Hartford, CT (US); William Chase, West Hartford, CT (US)

( * ) Notice: Subject to any disclaimer, the term of this patent is extended or adjusted under 35 U.S.C. 154(b) by 87 days.

(21) Appl. No.: 16/056,017

(22) Filed: Aug. 6, 2018

(65) Prior Publication Data
US 2019/0041850 A1 Feb. 7, 2019

Related U.S. Application Data (60) Provisional application No. 62/541,148, filed on Aug. 4, 2017.

(51) Int. Cl.
*G05D 1/00* (2006.01)
*B60W 50/029* (2012.01)
(Continued)

(52) U.S. Cl.
CPC ........ *G05D 1/0061* (2013.01); *B60W 50/029* (2013.01); *B60W 50/082* (2013.01);
(Continued)

(58) Field of Classification Search
CPC ........ G05D 1/0061; G05D 2201/0213; G05D 1/0088; G08G 1/0116; G08G 1/0967;
(Continued)

(56) References Cited

U.S. PATENT DOCUMENTS

| 7,907,063 B2 * | 3/2011 | Simon .............. G08G 1/096783 340/905 |
| 2009/0243883 A1 | 10/2009 | Simon |

(Continued)

FOREIGN PATENT DOCUMENTS

EP    3 121 084 A2    1/2017

OTHER PUBLICATIONS

International Search Report for International Application No. PCT/US2018/045403 dated Oct. 3, 2018.
(Continued)

*Primary Examiner* — Mahmoud S Ismail
*Assistant Examiner* — Gabriel Anfinrud
(74) *Attorney, Agent, or Firm* — McCormick, Paulding & Huber PLLC (57) ABSTRACT

An autonomous vehicle mode regulator system and method comprise transmitting authorization signals from autonomous driving infrastructure on a roadway to a controller module to authorize or inhibit operation of a vehicle in different levels of automation. The controller module controls the level of automation under which the autonomous driving system of the vehicle operates based on the signals received from the autonomous driving infrastructure. In this regard, the controller module can prevent the autonomous driving system of the vehicle from operating in certain levels of automation unless appropriate authorizations signals are received. Similarly, the controller module can permit or even require operation of the vehicle in certain levels of automation upon receipt of certain authorization signals. Still further, the controller module can inhibit or disengage operation of a vehicle in certain levels of automation upon receipt of signals from autonomous driving infrastructure associated with certain driving hazards on the roadway.

21 Claims, 5 Drawing Sheets

(51) Int. Cl.
*G08G 1/0967* (2006.01)
*G08G 1/01* (2006.01)
*B60W 50/08* (2020.01)
*B60W 50/12* (2012.01)

(52) U.S. Cl.
CPC .......... *B60W 50/12* (2013.01); *G05D 1/0088* (2013.01); *G08G 1/0116* (2013.01); *G08G 1/0967* (2013.01); *G08G 1/09675* (2013.01); *G08G 1/096725* (2013.01); *G08G 1/096783* (2013.01); *B60W 2050/0295* (2013.01); *B60W 2050/0297* (2013.01); *G05D 2201/0213* (2013.01)

(58) Field of Classification Search
CPC ......... G08G 1/096725; G08G 1/09675; G08G 1/096783; B60W 50/029; B60W 50/082; B60W 50/12; B60W 2050/0295; B60W 2050/0297

See application file for complete search history.

(56) References Cited

U.S. PATENT DOCUMENTS

| | | | |
|---|---|---|---|
| 2013/0325211 A1 | 12/2013 | El Fassi | |
| 2014/0156134 A1* | 6/2014 | Cullinane | B60W 50/082 701/23 |
| 2015/0134178 A1* | 5/2015 | Minoiu-Enache | B60W 50/035 701/23 |
| 2015/0241878 A1* | 8/2015 | Crombez | B60W 30/12 701/23 |
| 2015/0243165 A1* | 8/2015 | Elsheemy | B60R 25/00 340/906 |
| 2017/0102700 A1 | 4/2017 | Kozak | |
| 2017/0171375 A1* | 6/2017 | Kamata | H04B 1/3822 |
| 2018/0059663 A1* | 3/2018 | Yako | G06K 9/00845 |
| 2019/0294167 A1* | 9/2019 | Kutila | G06Q 10/04 |

OTHER PUBLICATIONS

Written Opinion for International Application No. PCT/US2018/045403 dated Oct. 3, 2018.

* cited by examiner

AUTONOMOUS VEHICLE MODE REGULATOR

CROSS-REFERENCE TO RELATED APPLICATIONS

This application claims the benefit under 35 U.S.C. § 119(e) of U.S. Provisional Application No. 62/541,148, filed Aug. 4, 2017, which is incorporated herein by reference in its entirety.

TECHNICAL FIELD OF THE INVENTION

The present invention generally relates to augmenting the operation of autonomous vehicles, and more particularly relates to a system and method for automatically controlling the activation and deactivation of autonomous operation of vehicles capable of operating in both autonomous and manual modes.

BACKGROUND OF THE INVENTION

Many companies are developing autonomous vehicles for commercial and personal use on existing roadways for a variety of applications, including but not limited to personal taxi services, delivery services, or the like. In accordance with the present invention, an autonomous vehicle is a vehicle capable of operating without a human driver. Such vehicles can be designed to operate utilizing an onboard computer and a system of sensors designed to operate the vehicle in the same manner as if there were a human operator.

Existing autonomous vehicles have many limitations due to the early developmental stage of the technology. In general, such vehicles can maneuver in existing traffic conditions, and generally operate from a Point A to a Point B utilizing existing sensors and satellite guidance technology. Such vehicles may be preprogrammed with a pick-up location and a drop-off location, or may be switched between a manual operational mode and an autonomous operational mode, sometimes during the course of travel.

Current autonomous vehicles in development and testing stage generally utilize multiple systems to operate the vehicle. First, a standard GPS system is used to plan a route for the vehicle. Taking into account the starting point and the destination for a trip, the GPS system determines the best path. However, autonomous vehicles also need a system to recognize dynamic conditions along the path during operation of the vehicle. Such a system may be referred to as a differential GPS system, which utilizes an array of technologies, such as cameras, sensors, radar, LIDAR and lasers to provide a three-dimensional view around the vehicle during operation. Such a system can keep track of other cars around the vehicle, detect obstacles or hazards around the car or in the road up ahead, determine the location of the edge of the road, upcoming turns, hills or descents, and assess general road conditions ahead, behind and around the vehicle. Autonomous vehicles also require a centralized system within the car to process the information provided from the differential GPS system. And other sensors provided on the vehicle, and utilize the processed information to operate the vehicle. Such a system commonly utilizes a Computer Area Network (CAN) Bus.

Non-autonomous vehicles also utilize similar technology to back-up a human driver. For example, cars have used various forms of cruise control for decades. More recently, cars have been equipped with systems that will autonomously parallel park the car. Many modern cars are now equipped with systems that assist the driver when the car begins to drift out of its lane on the highway, or brake the car if it is getting too close to the car in front of it, or alert the driver if there is a stopped vehicle, a pedestrian, or an object in the road ahead.

While much work has been done to develop visual, LIDAR, radar, and other technologies to allow vehicles, be they autonomous or quasi-autonomous, the capability to more reliably handle required navigation tasks, these efforts have been frustrated by limitations in the existing technologies used to operate autonomous vehicles, including the inability of prior art systems to reliably function in adverse conditions, such as during periods of inclement weather (e.g., rain, fog, frozen precipitation, high winds, etc.); when exposed to reflections from bright sunlight; when operating in improperly lit sections of roadway; or when potentially inhibited by objects in the road, such as debris or piles of leaves that can physically cover or mask traditional roadway markings, the edge of the road, or by wear or damage to the roadway itself, let alone overcoming the inevitable fading and deterioration of painted roadway markings or other identifiers typically utilized by cameras, lasers, radar, LIDAR and the like to process dynamic conditions of the road. Additionally, the cameras and sensors on an autonomous vehicle could occasionally be covered or blocked, such as by dirt or snow, or may be malfunctioning through ordinary wear or accident, thereby requiring a back-up system to ensure safe and efficient operation of the vehicle.

At the present, autonomous vehicle capability is nearing NHTSA level 3/SAE level 4 levels, which means they are on the cusp of, or are now capable of fully autonomous driving capability. However, there is a significant disconnect between having the capability to allow fully autonomous driving capabilities and the propriety of doing so in all areas or under all circumstances. While at the present, full autonomous technology may be appropriate for use on limited access highways and/or during other "optimum" or "testing" situations, the technology has not matured enough to the point where it is necessarily safe or appropriate enough for an autonomous vehicle to be able to operate at times in a full autonomous mode even in those "optimum" scenarios. For example, during periods of limited visibility or snow-covered roadway conditions, or during operation on gravel, dirt or other unpaved roads, or other atypical conditions, given these circumstances, the use of full autonomous modes should be dynamically regulated to prevent vehicles from operating beyond their inherent autonomous capability. Just as with "driven" vehicles that are capable of operating at speeds more than double the posted speed limits, the signs are posted to limit the driven operation of motor vehicles to a level lower then their ultimate capabilities. Accordingly, what is needed is a system for operation of autonomous and quasi-autonomous vehicles that can limit, or at least control use of, the capabilities of such vehicles when not specifically deemed appropriate by a governing body.

The overall projected transition time from the present nearly 100% "driven"/0% fully autonomous operational mix to a nearly 100% fully autonomous/0% driven mix is estimated to be about 20 years. It is anticipated that this transition period will encompass several different "phases", in which certain travel lanes and roadway infrastructure will transition from exclusive use by driven vehicles into a shared driven/autonomous usage condition, and finally into exclusive autonomous roadway usage wherein driven vehicles will be entirely prohibited from operation on certain roadways, just as currently certain motor vehicles that cannot attain proper highway speeds are prohibited from operating on limited access highways.

The "shared usage" time period is inherently the most dangerous one in that both types of vehicles will be on the same roadways sharing travel lanes, yet the autonomous vehicles may have the capability to continuously communicate with one another through Vehicle-to-Vehicle (V2V) means to coordinate their speeds and decision making, yet the driven vehicles will be responding only to the input of a driver (and still susceptible to human error). During this time frame, vehicles will increasingly possess full autonomous capability, but will not immediately have either the legal or infrastructure support to allow that capability to be fully used.

At present, because the technology of autonomous vehicles and the corresponding laws regarding their usage have not progressed sufficiently, said autonomous capabilities have, in many cases, been prohibited from being utilized at all. For those vehicles that possess some level of autonomous capability, a positive action by a driver is required in order to place an autonomously-capable vehicle into a partial or fully-autonomous operating mode. Where available, the decision to switch a vehicle into an autonomous driving mode is nevertheless subject to constant human misjudgments as to the appropriateness of doing so under certain conditions. Ironically, times of driver impairment when autonomous vehicle operation would be potentially the most helpful are also those times when the ability of a driver to make a proper decision to engage such a mode is also impaired.

A driver's decision whether or not to activate a fully autonomous driving mode will only become more complex in the future as, for example:

1) The number of autonomous vehicles on the road increases;

2) Certain portions of the roadway infrastructure evolve to be more compatible with autonomous vehicles (such as being equipped with Vehicle-to-Infrastructure (V2I) equipment);

3) Certain portions of the roadway infrastructure become approved for full autonomous vehicular operation; and 4) The capabilities of autonomous vehicles evolve.

Accordingly, there is a need for an improved system for the operation of autonomous and quasi-autonomous vehicles on roadways where such vehicles are sharing the road with other autonomous and quasi-autonomous vehicles, as well as manually-driven vehicles. For example, for travel lanes that have been exclusively dedicated to autonomous vehicle operation, there needs to be a means of automatically enabling and engaging autonomous modes for those vehicles that possess said capability, while preventing those vehicles that lack such capability from even entering said travel lanes to ensure that all of the autonomous-capable vehicles that operate in the exclusive autonomous vehicle travel lanes do so only in a full-autonomous mode. In this regard, there needs to be a more objective rather than subjective means for enabling a vehicle to operate autonomously. There likewise needs to be an objective means for disabling vehicles from autonomous or quasi-autonomous modes, especially in consideration of weather conditions, roadway conditions, accidents or dangers on the roadway, and roadwork or high traffic on the roadway that may affect safe autonomous operation of vehicles. While presently various levels of vehicular autonomy may be legal only with the continuous oversight of a driver, as the technology and the laws start allowing unsupervised fully autonomous driving modes to be selected, an automatic means for preventing the inappropriate selection and use of such fully autonomous vehicular capability needs to be employed. Thus, there is a need for a system that utilizes information or instructions obtained and/or received from roadway infrastructure on a roadway that will assist in the safe and efficient operation of autonomous vehicles.

SUMMARY OF THE INVENTION

The present application is directed to an Autonomous Vehicle Mode Regulator (AVMR) system and method for regulating an operational mode of an autonomous vehicle on a roadway.

In an embodiment of the present invention, an AVMR comprises a controller module adapted to wirelessly receive signals from autonomous driving infrastructure. The controller module is operatively connected to an autonomous driving system in a vehicle adapted to operate in different levels of automation. The controller module controls the level of automation under which the autonomous driving system of the vehicle operates based on the signals received from the autonomous driving infrastructure.

In some embodiments, the signals received from the autonomous driving infrastructure indicate the level of automation under which the vehicle is permitted or is required to operate. Similarly, in some embodiments, the controller module controls the autonomous driving system of the vehicle to operate in one or more of the different levels of automation upon receiving signals from autonomous driving infrastructure indicating that a certain level of automation is permitted or required for a roadway or designated travel lane.

In preferred embodiments, the present invention is designed to automatically prohibit the engagement of "full", "quasi" and/or unsupervised autonomous vehicle operation (i.e., unsupervised acceleration, braking, and steering autonomous driving modes) unless the system receives an implicit hardware approval of said operation, for example, by a governing authority, as transmitted to the AVMR via autonomous driving infrastructure. Just as a driven vehicle is not allowed to proceed in the presence of a red traffic signal, an AVMR in accordance with preferred embodiments of the present invention, would lockout the ability of a driver to manually select and engage any autonomous mode, and especially a full autonomous mode, without the presence of said authorization signal.

In accordance with embodiments of the present invention, only those roadways, or portions thereof, that have been previously deemed acceptable for autonomous vehicle operation would be equipped with autonomous driving infrastructure or various hardware means to communicate authorization signals to the vehicles operating on them permitting autonomous operation of vehicles on such roadways, or portions thereof. The authorization signaling means could employ either a proprietary AVMR signaling system, elements of a V2I infrastructure, or any number of other signaling methods commonly known in the art. Preferably, such authorization signals are wirelessly transmitted to vehicles equipped with appropriate AVMR equipment.

The present invention is especially useful for the initial adoption phase of autonomous vehicular transition where roadways will include a mix of fully autonomous, quasi-autonomous and manually-driven vehicles. The present invention will also be useful for transitional phases where certain travel lanes will be designated for exclusive autonomous vehicular operation or restricted for such autonomous operation. Infrastructure associated with such travel lanes can be used to regulate operational modes for vehicles travelling on the roadway in accordance with the present invention.

In some embodiments, the controller module prevents manual control of the level of automation under which the autonomous driving system of the vehicle operates. Similarly, in some embodiments, the controller module prevents the autonomous driving system of the vehicle from operating in one or more of the different levels of automation upon receiving signals from autonomous driving infrastructure indicating that only certain levels of automation are permitted on the roadway or in certain travel lanes, or that certain levels of automation are specifically restricted on the roadway or certain travel lanes. Equally importantly, just as many present roadways are equipped with dynamically variable speed limit signs that have the capability to lower the posted speed limits in the presence of an accident or less than ideal traffic conditions, or during adverse weather conditions, roadways approved for modes of autonomous operation would include infrastructure and hardware with the capability to dynamically rescind this authorization for a multitude of safety or operational reasons. Thus, an AVMR in accordance with the present invention would similarly limit (albeit preferably in an automatic dynamic fashion) the capabilities of an autonomous vehicle when not specifically deemed appropriate by a governing body, such as when an accident occurs on the roadway, where there is high traffic volume or undesirable traffic conditions, where there are unsafe roadway conditions, or where there is adverse weather conditions.

In another embodiment of the present invention, a method of regulating an operational mode of an autonomous vehicle comprises wirelessly receiving signals from autonomous driving infrastructure, communicating with an autonomous driving system of a vehicle adapted to operate in different levels of automation, and controlling the level of automation under which the autonomous driving system of the vehicle operates based on the signals received from the autonomous driving infrastructure.

In some embodiments, the method of regulating an operational mode of an autonomous vehicle comprises preventing manual selection of the level of automation under which the autonomous driving system of the vehicle operates.

In some embodiments, the method of regulating an operational mode of an autonomous vehicle comprises preventing the autonomous driving system of the vehicle from operating in one or more of the different levels of automation upon receiving signals from autonomous driving infrastructure indicating that only certain levels of automation are permitted.

In some embodiments, the method of regulating an operational mode of an autonomous vehicle comprises controlling the autonomous driving system of the vehicle to operate in one or more of the different levels of automation upon receiving signals from autonomous driving infrastructure indicating that a certain level of automation is required.

In some embodiments of the present invention, the levels of automation that are permitted and/or restricted on a roadway or certain designated travel lanes are defined by a government agency, including the Department of Transportation or the National Highway Traffic Safety Administration in the United States.

Objects, features and advantages of the present invention will become apparent in light of the description of embodiments and features thereof, as enhanced by the accompanying figures.

DETAILED DESCRIPTION OF EMBODIMENTS OF THE INVENTION

Figure 1A:
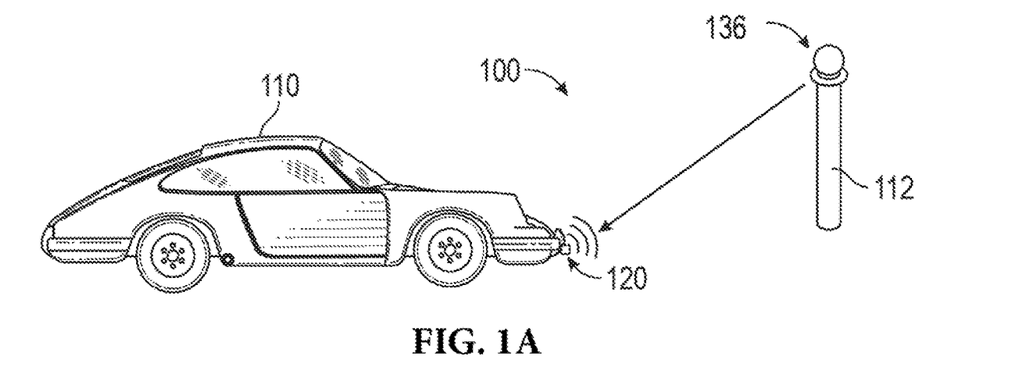
FIGS. 1A and 1B illustrate side and top schematic views, respectively, of a first aspect of an autonomous vehicle mode regulator system in accordance with the present invention involving the exchange of instructions between autonomous driving infrastructure and vehicles.
Figure 1B:
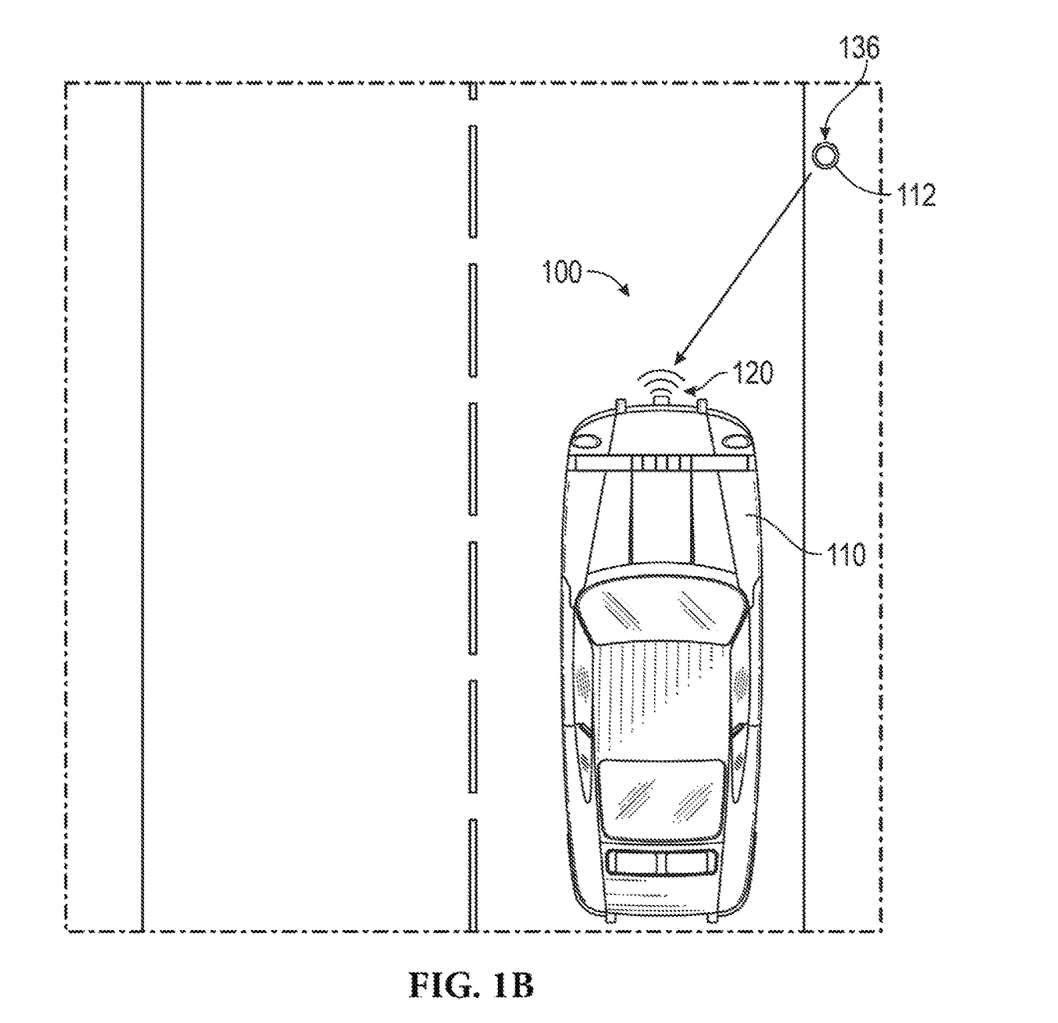
Figure 2:
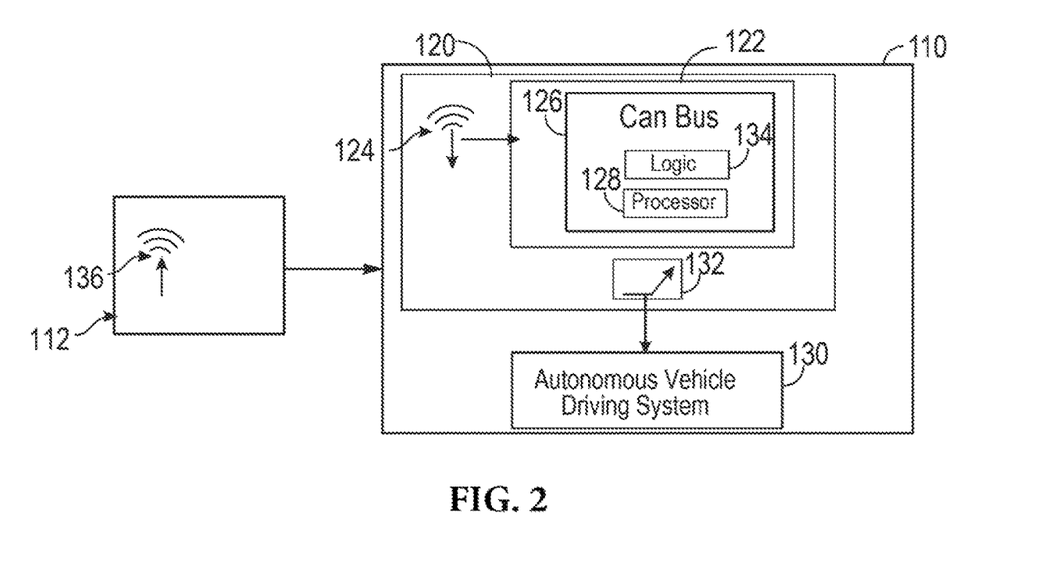
FIG. 2 provides a general schematic illustrating the interaction between the autonomous vehicle mode regulator system in accordance with the present invention and autonomous driving infrastructure.
Figure 3:
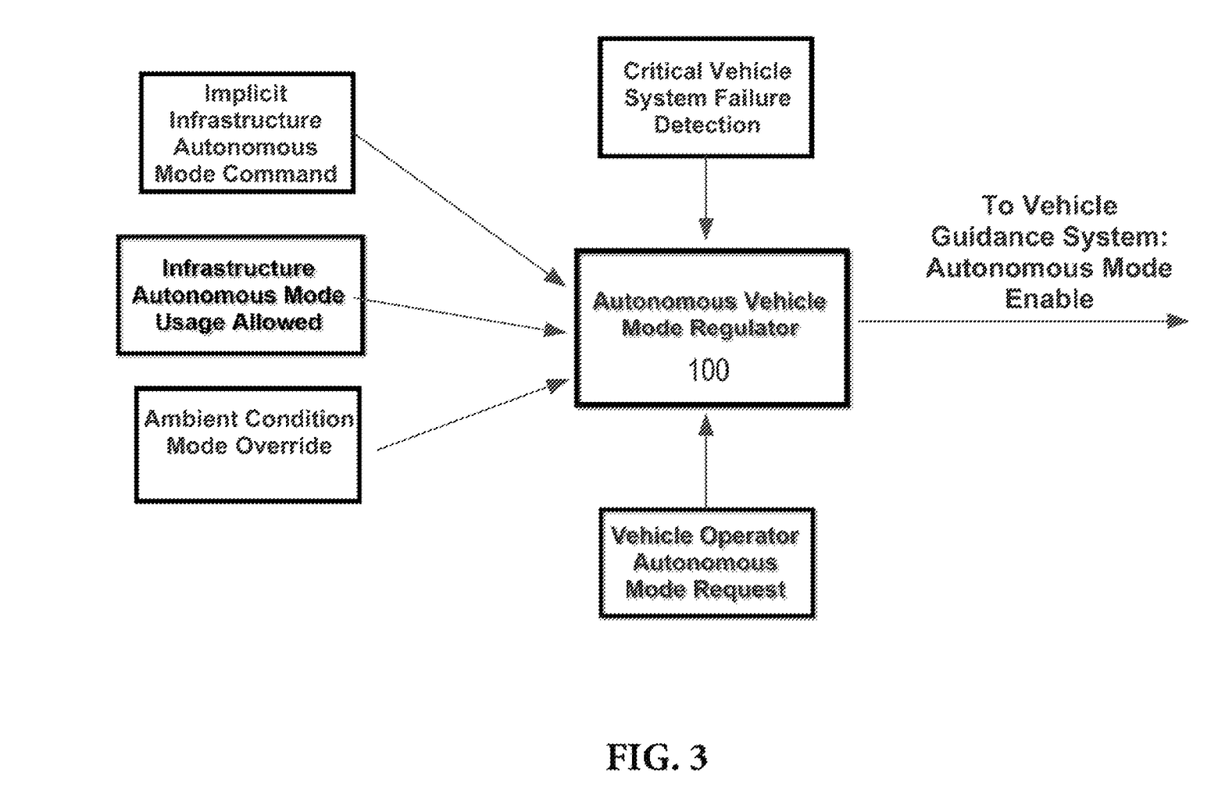
FIG. 3 provides a schematic illustrating the flow of enable and disable commands to the autonomous vehicle mode regulator system in accordance with the present invention.

Exemplary embodiments of an autonomous vehicle mode regulator system in accordance with the present invention are illustrated in FIGS. 1 and 2, and generally designated by reference numeral 100. The autonomous vehicle mode regulator system 100 is adapted to work in connection with autonomous driving infrastructure 112, generally illustrated in FIGS. 1 and 2 as a post, which is positioned near a roadway or travel lane to transmit authorization instructions and signals to passing vehicles. Referring to FIG. 3, the autonomous vehicle mode regulator system 100 is adapted to receive a variety of mode commands for enabling or disabling levels of autonomous operation for a vehicle 110 equipped with appropriate systems and hardware for autonomous, quasi-autonomous, selective autonomous, and manual-driven operation, including, as illustrated, signals received from autonomous driving infrastructure 112 (such as, implicit infrastructure autonomous mode commands, infrastructure autonomous mode usage allowance and ambient condition mode override), or from the vehicle 110 (such as, critical vehicle system failure detection, or vehicle operator autonomous mode request). The use of the system 100 for controlling or inhibiting use and operation of the autonomous levels of the vehicle 110 is described in more detail below.

As shown, an autonomous vehicle 110 is equipped with mode regulator hardware, designated by reference numeral 120, and which preferably includes a controller module 122 and a receiver 124. As illustrated in FIG. 2, the controller module 122 of the mode regulator hardware 120 preferably includes a CAN Bus 126 disposed on the vehicle 110, which communicates with or includes a processor 128 handling autonomous operation of the vehicle 110 in combination with the autonomous vehicle driving system 130, which generally includes various operating systems, GPS system, differential GPS system, and the like, generally represented as reference numeral 130. The controller module 122 also includes an Enable Switch 132 which can be engaged upon receipt of an authorization signal from autonomous driving infrastructure 112 on a roadway permitting the vehicle 110 to be switched into an autonomous operation mode, or disengaged to inhibit operation of the vehicle 110 in autonomous operation modes upon receipt of signals indicating that such autonomous operational modes are not permitted for the vehicle 110 on the roadway. The controller module 122 can also include a programmable logic device 134 in connection with the CAN Bus 126 for control of the autonomous vehicle driving system 130 based on signals received from autonomous driving infrastructure 112 on a roadway indicating permissible or restricted modes of operation for the roadway.

Preferably, the receiver 124 of the mode regulator hardware 120 is located on the vehicle 110 in a position where it can pick up transmissions from autonomous driving infrastructure 112 located on a roadway, such as the post illustrated in FIGS. 1 and 2. As illustrated in FIG. 1, a receiver 124 is located on the front of the vehicle 110 for illustration purposes. The receiver 124 can be positioned elsewhere on the vehicle 110 without departing from the spirit and principles of the present invention, such as on the back, underside, or roof of the vehicle 110. Still further, the vehicle 110 can use a network of receiver devices 124 positioned around the vehicle 110 so as to enhance the vehicle's ability to pick up signals from autonomous driving infrastructure 112 regardless of the vehicle's speed or location to a roadway, traffic congestion, weather conditions, or the like. So, for example, a vehicle 110 could include a front receiver and a rear receiver, both of which provide signals to the controller module 122 before being sent to the CAN Bus 126 and programmable logic device 134 to adjust or maintain operation of the vehicle 110.

The autonomous driving infrastructure 112 generally includes a transmitter 136, which directs authorization signals to vehicles 110 to regulate and control autonomous operation of such vehicles 110. In this regard, the infrastructure 112 can comprise a post, a sign, a street light, a traffic signal, a guardrail, a tool booth, structure mounted to buildings, or the like. As illustrated in FIGS. 1 and 2, a post having a transmitter 136 is positioned on the side of a roadway and transmits wireless signals to passing vehicles 110. Alternatively, infrastructure components can be associated with individual travel lanes, such as on a multi-lane highway, and be positioned accordingly to provide authorization signals to vehicles 110 travelling in particular travel lanes. The infrastructure 112 could employ a proprietary mode regulator signaling system for transmitting instructions to passing vehicles 110, which signaling system can be dynamically programmed based on road, weather and traffic conditions or patterns. Alternatively, the infrastructure 112 could comprise elements of a Vehicle-to-Infrastructure system or other roadway-to-vehicle signaling means, proving one-way or even two-way communications to exchange pertinent travel and safety information.

In accordance with the present invention, the signals transmitted from the autonomous driving infrastructure 112 can either enable said vehicles 110 to operate in certain levels of automation, or restrict autonomous operation of vehicles 110. The autonomous driving infrastructure 112 is preferably located proximate a roadway, or even a specific travel lane, so that traffic in said roadway or in said specific travel lane can be precisely controlled. Thus, for example, if a roadway has a designated travel lane for autonomous operation only, the infrastructure 112 can be situated at the start of a restriction zone of said travel lane and send instructions to a vehicle 110 that permit enabling of an autonomous operational mode in the vehicle 110, which thereby would permit the vehicle 110 from travelling in the dedicated autonomous travel lane. Similarly, signals could be sent to vehicles 110 without autonomous operation capability to ensure that such vehicles 110 do not enter into any travel lane designated for full autonomous vehicles only. Further, autonomous driving infrastructure 112 could be positioned at the end of the restriction zone of the travel lane to alert vehicles 110 operating in autonomous mode to disengage from said mode, such as when merging with manually-driven vehicles. Alternatively, the infrastructure 112 can even send signals that will directly disengage autonomous operation of vehicles 110. Still further, infrastructure 112 can be spatially positioned along the roadway or a dedicated travel lane to send signals and instructions to passing vehicles 110, and even disengage autonomous operational modes for a variety of reasons, such as, for example, if there is an accident or danger ahead, traffic conditions not preferable for autonomous operation, bad roadway conditions, or adverse weather conditions.

Figure 4:
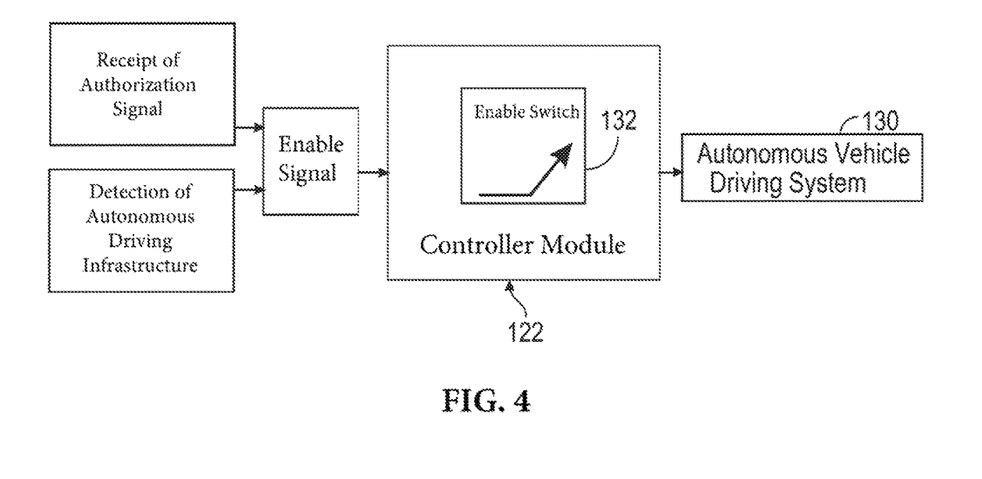
FIG. 4 provides a general schematic illustrating the interaction between the autonomous vehicle mode regulator system, equipped with an "Enable Switch" in accordance with the present invention, and autonomous driving system of a vehicle.

As noted, the autonomous vehicle mode regulator system 100 of the present invention can be used to control the level of automation under which the autonomous vehicle driving system 130 of the vehicle 110 operates based on signals received from autonomous driving infrastructure 112 located along a roadway. In this regard, the control of automation in a vehicle 110 can either enable operation in a certain level of automation (e.g., full autonomous operation, quasi-autonomous operation, or selective autonomous operation) or restrict autonomous operation. A general schematic illustrating the interaction between the autonomous vehicle mode regulator system 100, equipped with an "Enable Switch" 132, and autonomous driving infrastructure 112 is illustrated in FIG. 4. There, authorization is received by the controller module 122 in the form of an "enable signal", based on the detection of autonomous driving infrastructure and the receipt of an appropriate authorization signal therefrom. Activation of the Enable Switch 132 directs instructions to the autonomous vehicle driving system 130 permitting operation of the vehicle 110 in an autonomous mode.

In accordance with the present invention, the system 100 can operate to prevent manual selection or activation of the level of automation under which the autonomous driving system 130 of the vehicle 110 operates—that is, autonomous operation can only be enabled when the vehicle receives an authorization signal from autonomous driving infrastructure 112 permitting such autonomous operation of the vehicle 110. Similarly, the system 100 can prevent the autonomous driving system 130 of the vehicle 110 from operating in one or more modes of autonomous operation upon receiving signals from autonomous driving infrastructure 112 indicating that only certain levels of automation are permitted—e.g., for a restricted travel lane requiring full autonomous operation of all vehicles 110 in the travel lane. Further, the system 100 can control the autonomous driving system 130 of the vehicle 110 to operate in a certain level of automation upon receiving signals from autonomous driving infrastructure 112 indicating that a certain level of automation is required for continued travel.

In further accordance with the present invention, the system 100 can prevent or even disable operation of a vehicle 110 in a level or mode of autonomous operation by sending an appropriate signal to the vehicle 110 and its autonomous driving system 130. Thus, roadways approved for full autonomous operation can include infrastructure 112 with the capability to dynamically rescind autonomous authorization for a multitude of safety or operational reasons. For example, the system 100 can prevent the autonomous driving system 130 of the vehicle 110 from operating in one or more level of automation, as desired, upon receiving signals from autonomous driving infrastructure 112 indicating dangerous driving conditions, dangerous roadway conditions, or adverse weather conditions. Signals restricting autonomous operation of vehicles 110 on a roadway or in certain travel lanes can also be sent if there is an accident ahead, or obstructions in the roadway, or high volumes of traffic. Such restrictions and signals can be defined and controlled by a government agency, such as the Department of Transportation or the National Highway Traffic Safety Administration. A general schematic illustration identifying external signals that can be sent to the system 100 via autonomous driving infrastructure 112 is illustrated in FIG. 5.

Figure 5:
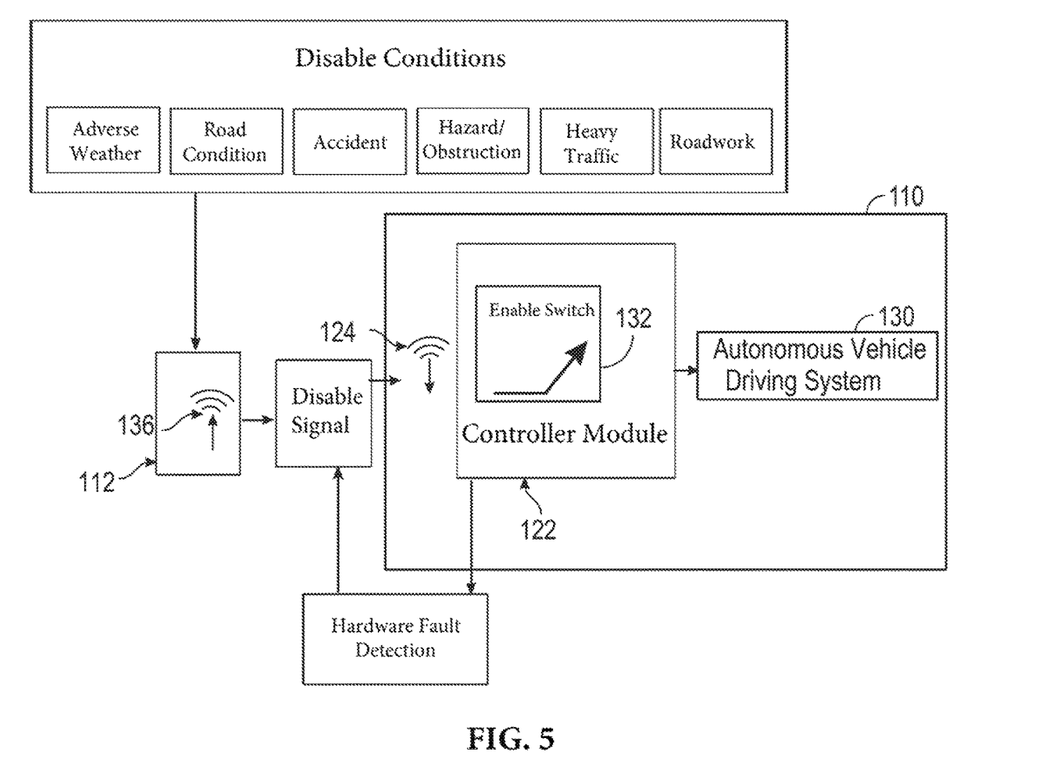
FIG. 5 provides a general schematic illustrating the disabling of the autonomous driving system of a vehicle based on signals received from autonomous driving infrastructure restricting use of certain levels of automation in accordance with the present invention.

Referring to FIG. 5, disable conditions, as possible dictated by a government agency, could include: adverse weather, road condition, accident, hazard/obstruction, heavy traffic, roadwork, or the like. Information associated with such disable conditions is provided to autonomous driving infrastructure 112 proximate the conditions affecting travel on a roadway or within particular travel lanes. The autonomous driving infrastructure 112 will provide a disable signal to passing vehicles 110, which can disengage from autonomous modes of operation. Similarly, vehicles 110 that are not operating autonomously would recognize any "disable signal" received from autonomous driving infrastructure as inhibiting use of any level of automation until authorization signals are received. Additionally, as also illustrated in FIG. 5, the vehicle 110 can also monitor its own autonomous vehicle driving system 130 and if any hardware fault, failure or damage is detected, disable the Enable Switch 132 to change out of autonomous modes of operation where necessary and safe.

The autonomous vehicle mode regulator system 100 in accordance with the present invention will have great utility during the adoption of autonomous vehicles 110 on current roadways, and where many roadways will including vehicles operating in varied modes of operation, including full autonomous operation, quasi-autonomous operation and manually-driven operation. During the initial adoption phase of autonomous vehicular transition, which is currently happening, the system 100 is designed to automatically prohibit the engagement of "full" and/or unsupervised autonomous vehicle operation (i.e., unsupervised acceleration, braking and steering autonomous driving modes) unless the vehicle 110 receives approval of said operation, for example, by a governing authority via autonomous driving infrastructure 112, as described herein. In embodiments, the system 100 would lock out or inhibit the ability of a driver to manually select and engage a full autonomous mode without the presence of authorization signals received from the autonomous driving infrastructure 112. Once authorization is received, the vehicle 110 can switch into an autonomous operational mode and travel in designated areas exclusively with other autonomous vehicles 110. As noted, the infrastructure 112 can also have capability to rescind such authorization as necessary, such as for safety or operational reasons.

As the initial driven-to-autonomous transition period gives way to the next transition phase wherein, for example, travel lanes that have been exclusively dedicated to autonomous vehicle operation are in existence, the autonomous vehicle mode regulator system 100 of the present invention provides a means of automatically enabling and engaging full autonomous modes for those vehicles 110 that possess said capability, while preventing those vehicles 110 that lack such capability from even entering said dedicated travel lanes to ensure that all of the autonomous-capable vehicles 110 that operate in the exclusive autonomous vehicle travel lanes do so only in a full-autonomous mode.

Similarly, at the end of the driven-to-autonomous transition period, the autonomous vehicle mode regulator system 100 in accordance with the present invention also provides a means for preventing any vehicle 110 that lacks an appropriate autonomous capability from entering autonomous-only designated roadways at all. This would mean that any non-autonomous vehicles 110 still in operation would be required to be retrofitted with appropriate hardware to aid in preventing mis-operation of such vehicles 110, which is roughly analogous to today's requirement that horse-drawn equipment that operate on vehicular roadways be equipped with certain lighting and visual safety equipment.

In accordance with an aspect of the present invention, the autonomous vehicle mode regulator system 100 can switch a vehicle's operational mode into an autonomous operation mode upon receipt of authorization signals from autonomous driving infrastructure 112 where mandated in specific circumstances, such as when the vehicle 110 enters a dedicate "autonomous vehicles only" travel lane.

In accordance with another aspect of the present invention, the autonomous vehicle mode regulator system 100 can inhibit a vehicle 110 with autonomous capability from activating or shifting into autonomous operational mode on a roadway that is experiencing a hazardous traffic condition (e.g., accident, slow traffic, objects in the roadway) or adverse weather conditions, where such conditions are being transmitted to the vehicle by the autonomous driving infrastructure. Moreover, a vehicle's autonomous operational mode can be disengaged upon receipt of signals from the infrastructure 112 for safety reasons by disabling the "Enable Switch" 132, as indicated in FIG. 5.

Figure 6:
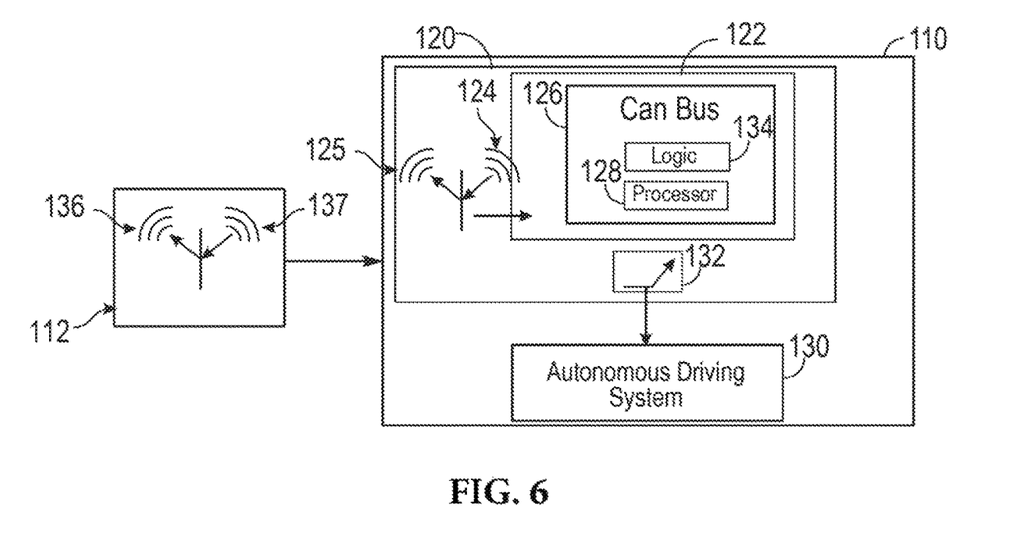
FIG. 6 provides a general schematic illustrating the interaction between an autonomous vehicle mode regulator system in accordance with an alternate embodiment of the present invention and autonomous driving infrastructure.

The controller module 122 provided on a vehicle 110 in connection with the autonomous vehicle mode regulator system 100 could include a transmitter/receiver set-up, or alternatively a transceiver set-up, providing two-way communication with autonomous driving infrastructure, as generally illustrated in FIG. 6. As described above, the system 100 generally operates to receive instructions from said infrastructure 112, preferably via wireless signals, providing authorization for autonomous vehicular operation, restricting operation in autonomous operational modes, or disabling autonomous operation. In some embodiments, the system 100 onboard the vehicle 110 can be adapted to communicate with autonomous driving infrastructure 112, for example, via Vehicle-to-Infrastructure signaling means including a transmitter 125, to confirm receipt of instructions for activation or deactivation purposes. Further, information can be sent from the vehicle 110 via transmitter 125 to the autonomous driving infrastructure 112, which includes an appropriate receiver 137 or transceiver means, indicating the operational status of the vehicle 110, including current mode of operation of the vehicle, or failure of one of a plurality of operational systems associated with the vehicle's autonomous driving system 130 (e.g., GPS loss or failure, main LIDAR failure, etc.).

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. An Autonomous Vehicle Mode Regulator (AVMR) comprising:
    a controller module adapted to wirelessly receive authorization and/or control signals from autonomous driving infrastructure;
    wherein the controller module is operatively connected to an autonomous driving system of a vehicle adapted to operate in different levels of automation;
    wherein the controller module controls the level of automation under which the autonomous driving system of the vehicle operates based on the signals received from the autonomous driving infrastructure;
    wherein the signals received from the autonomous driving infrastructure indicate the level of automation under which the vehicle is permitted or is required to operate;
    wherein the controller module prevents the autonomous driving system of the vehicle from operating in one or more of the different levels of automation each having at least some degree of autonomous operation upon receiving signals from autonomous driving infrastructure indicating that only certain levels of automation are permitted; and
    wherein the controller module is adapted to wirelessly transmit a signal to the autonomous driving infrastructure indicating a current mode of operation of the vehicle.

2. The AVMR according to claim 1, wherein the signals received from the autonomous driving infrastructure indicate driving conditions, including weather, road conditions, traffic or accidents.

3. The AVMR according to claim 2, wherein the controller module prevents the autonomous driving system of the vehicle from operating in one or more of the different levels of automation upon receiving signals from autonomous driving infrastructure indicating dangerous driving conditions.

4. The AVMR according to claim 1, wherein the level of authorized automation is defined by a government agency, including the Department of Transportation or the National Highway Traffic Safety Administration in the United States.

5. The AVMR according to claim 1, wherein the controller module comprises a switch that controls the level of automation under which the autonomous driving system of the vehicle operates.

6. The AVMR according to claim 1, wherein the controller module comprises a programmable logic device.

7. The AVMR according to claim 1, wherein the controller module prevents manual control of the level of automation under which the autonomous driving system of the vehicle operates.

8. The AVMR according to claim 1, wherein the controller module controls the autonomous driving system of the vehicle to operate in one or more of the different levels of automation upon receiving signals from autonomous driving infrastructure indicating that a certain level of automation is required.

9. The AVMR according to claim 1, wherein the controller module receives a signal from the autonomous driving system indicating an operational status of the vehicle, including failure of one of a plurality of operational systems.

10. The AVMR according to claim 9, wherein the controller module controls the level of automation under which the autonomous driving system of the vehicle operates based on the signal received from the autonomous driving system indicating the operational status of the vehicle.

11. The AVMR according to claim 9, wherein the controller module prevents the autonomous driving system of the vehicle from operating in one or more of the different levels of automation upon receiving the signal from the autonomous driving system indicating failure of one of a plurality of operational systems.

12. The AVMR according to claim 1, wherein the controller module is adapted to wirelessly transmit a signal to the autonomous driving infrastructure indicating an operational status of the vehicle and/or a failure of one of a plurality of operational systems associated with an autonomous driving system of the vehicle.

13. A method of regulating an operational mode of an autonomous vehicle, comprising the steps of:
    wirelessly receiving signals from autonomous driving infrastructure;
    communicating with an autonomous driving system of a vehicle adapted to operate in different levels of automation;
    controlling the level of automation under which the autonomous driving system of the vehicle operates based on the signals received from the autonomous driving infrastructure, wherein the signals received from the autonomous driving infrastructure indicate the level of automation under which the vehicle is permitted or is required to operate;
    controlling the autonomous driving system of the vehicle to operate in one or more of the different levels of automation upon receiving signals from autonomous driving infrastructure indicating that a certain level of automation is required; and
    transmitting a signal to the autonomous driving infrastructure indicating a current mode of operation of the autonomous vehicle;
    wherein the autonomous driving system of the vehicle is prevented from operating in one or more of the different levels of automation each having at least some degree of autonomous operation upon receiving signals from autonomous driving infrastructure indicating that only certain levels of automation are permitted.

14. The method according to claim 13, wherein the signals received from the autonomous driving infrastructure indicate driving conditions, including weather, road conditions, traffic or accidents.

15. The method according to claim 13, wherein the level of automation is defined by a government agency, including the Department of Transportation or the National Highway Traffic Safety Administration in the United States.

16. The method according to claim 13, further comprising the step of: preventing manual control of the level of automation under which the autonomous driving system of the vehicle operates.

17. The method according to claim 14, further comprising the step of:
    preventing the autonomous driving system of the vehicle from operating in one or more of the different levels of automation upon receiving signals from autonomous driving infrastructure indicating dangerous driving conditions.

18. The method according to claim 13, further comprising the step of:

receiving a signal from the autonomous driving system indicating an operational status of the vehicle, including failure of one of a plurality of operational systems.

19. The method according to claim 18, further comprising the step of:
controlling the level of automation under which the autonomous driving system of the vehicle operates based on the signal received from the autonomous driving system indicating the operational status of the vehicle.

20. The method according to claim 18, further comprising the step of:
preventing the autonomous driving system of the vehicle from operating in one or more of the different levels of automation upon receiving the signal from the autonomous driving system indicating failure of one of a plurality of operational systems.

21. The method according to claim 13, further comprising transmitting a signal to the autonomous driving infrastructure indicating an operational status of the autonomous vehicle and/or a failure of one of a plurality of operational systems associated with an autonomous driving system of the autonomous vehicle; and
wherein the wirelessly receiving signals from the autonomous driving infrastructure includes a signal preventing the autonomous vehicle from operating in one or more of the different levels of automation generated based on the signal to the autonomous driving infrastructure indicating the operational status of the autonomous vehicle and/or the failure of one of the plurality of operational systems associated with the autonomous driving system of the autonomous vehicle.

* * * * *